(12) United States Patent
Ding

(10) Patent No.: US 7,830,656 B2
(45) Date of Patent: Nov. 9, 2010

(54) MOUNTING APPARATUS FOR DATA STORAGE DEVICE

(75) Inventor: Lin Ding, Shenzhen (CN)

(73) Assignees: Hong Fu Jin Precision Industry (ShenZen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 370 days.

(21) Appl. No.: 12/061,652

(22) Filed: Apr. 3, 2008

(65) Prior Publication Data
US 2009/0212182 A1  Aug. 27, 2009

(30) Foreign Application Priority Data
Feb. 21, 2008  (CN) .................... 2008 2 0300255 U

(51) Int. Cl.
*H05K 5/00* (2006.01)
*H05K 7/00* (2006.01)
(52) U.S. Cl. .............................. 361/679.37; 361/679.39
(58) Field of Classification Search ............ 361/679.37, 361/679.39
See application file for complete search history.

(56) References Cited

U.S. PATENT DOCUMENTS

| 4,979,909 | A | 12/1990 | Andrews |
| 6,625,014 | B1 | 9/2003 | Tucker et al. |
| 6,646,872 | B1 | 11/2003 | Chen |
| 7,102,885 | B2 * | 9/2006 | Chen et al. ............. 361/679.31 |

* cited by examiner

*Primary Examiner*—Jayprakash N Gandhi
*Assistant Examiner*—Anthony M Haughton
(74) *Attorney, Agent, or Firm*—Frank R. Niranjan

(57) ABSTRACT

A mounting apparatus for a data storage device (30) with at least a stud (32) includes a bracket (10) for receiving the data storage device therein and a locking member (20) to secure the data storage device. The bracket includes a side panel (12) with at least a slot (123) defined therein for slidably receiving the stud of the data storage device therein. The locking member includes a pivot portion (24) rotatably attached to the side panel of the bracket, and a resilient arm (22) extending from the pivot portion. The pivot portion of the locking member includes a guiding edge (2433) for facilitating the stud of the data storage device sliding into the bracket to a secured position and a blocking edge (2435) for engaging with the stud of the data storage device in the secured position.

17 Claims, 4 Drawing Sheets

MOUNTING APPARATUS FOR DATA STORAGE DEVICE

BACKGROUND

1. Technical Field

The present invention relates to mounting apparatuses, and more particularly to a mounting apparatus for a data storage device.

2. General Background

Various data storage devices are installed in computers for communication and handling of data. Such devices include, for example, hard disk drives, floppy disk drives, and CD-ROM drives.

A conventional data storage device is directly attached to a computer enclosure with bolts. However, attachment with bolts is unduly complicated and time-consuming.

Thus, screwless mounting means for data storage devices are developed. For example, an anchoring apparatus for computer drives without using screws includes an anchor plate coupling on two struts located on an installation rack of the drives. The anchor plate pivotally and respectively engages with an actuating member on the left side and the right side through stub shafts. The anchor plate has anchor stubs corresponding to anchor holes of the installation rack. Each strut is coupled with a return spring. The actuating member has a driving lever on an outer side and an inner side extended to form a driven end. The driving lever may be moved to a return position thereby to replace and install the drive without disassembling screws. However, the structure of the anchoring apparatus is complicated. Furthermore, assembly and disassembly of the anchoring apparatus is cumbersome and time-consuming.

What is needed, therefore, is a mounting apparatus for a data storage device with simplified configuration of which assembly or disassembly is easy.

SUMMARY

A mounting apparatus for a data storage device with at least a stud includes a bracket for receiving the data storage device therein and a locking member to secure the data storage device. The bracket includes a side panel with at least one slot defined therein for slidably receiving the stud of the data storage device therein. The locking member includes a pivot portion rotatable about an axis perpendicular to the side panel of the bracket, and a resilient arm extending from the pivot portion capable of urging the pivot portion to rotate back to its original position. The pivot portion of the locking member includes a guiding edge for facilitating the stud of the data storage device sliding into the bracket to a secured position and a blocking edge for engaging with the stud of the data storage device in the secured position.

Other advantages and novel features will be drawn from the following detailed description of preferred embodiments with attached drawings, in which:

DETAILED DESCRIPTION

Figure 1:
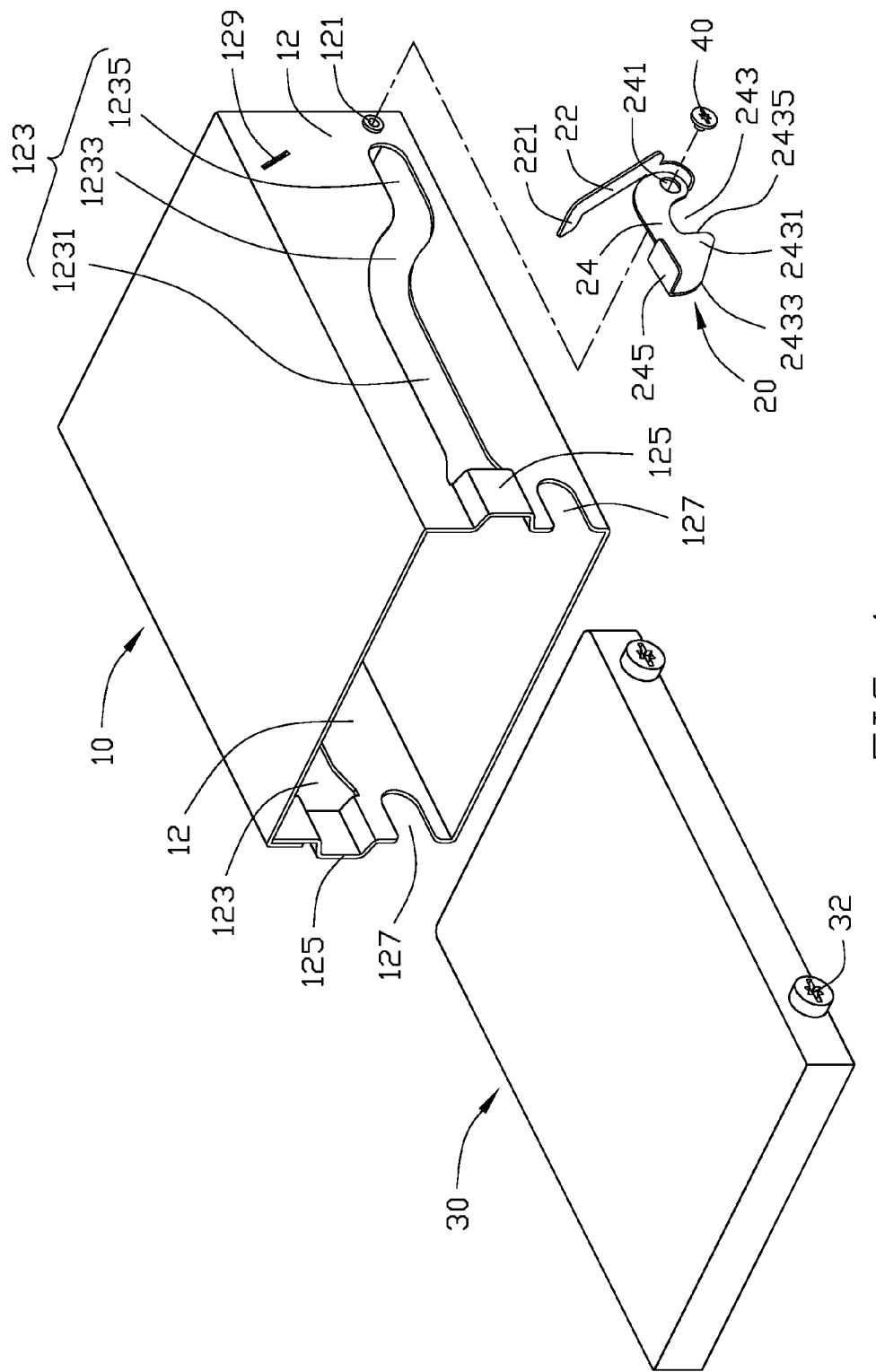
FIG. 1 is an exploded, isometric view of a mounting apparatus for a data storage device of a preferred embodiment of the present invention, the mounting apparatus including a bracket, a locking member, and a fixing member.

Referring to FIG. 1, a mounting apparatus for a data storage device 30 of an embodiment of the present invention includes a bracket 10, a locking member 20, and a fixing member 40. The data storage device 30 includes a pair of parallel sidewalls. Each of the sidewalls of the data storage device 30 has a pair of studs 32 attached thereon.

The bracket 10 includes a pair of parallel side panels 12. A pivot post 121 with a locking hole defined therein protrudes perpendicularly from a rear end of one of the side panels 12. A first sliding slot 123 is defined in each of the side panels 12. The first sliding slot 123 includes a first sliding section 1231, a second sliding section 1235 parallel to and lower than the first sliding section 1231, and an inclined connecting section 1233 connected between the first sliding section 1231 and the second sliding section 1235. A shielding portion 125 protrudes from a front end of the first sliding section 1231 of the first sliding slot 123 of each of the side panels 12. A second sliding slot 127 is defined in a front end of each of the side panels 12 aligned with the corresponding second sliding section 1235 of the first sliding slot 123. A resisting slot 129 is defined in each of the side panels 12 above the pivot post 121.

The locking member 20 includes a pivot portion 24 and a resilient arm 22 extending upwardly and slantingly from a bottom end of the pivot portion 24. A protruding piece 221 extends from a distal end of the resilient arm 22 corresponding to the resisting slot 129 of the bracket 10. A pivot hole 241 corresponding to the pivot post 121 of the bracket 10 is defined in the pivot portion 24. A cutout 243 is defined in the pivot portion 24 in front of the pivot hole 241. The pivot portion 24 has a hook 2431 formed in front of the cutout 243. A handle 245 extends perpendicularly from an upper end of the pivot portion 24. The hook 2431 includes an inclined guiding edge 2433 and a blocking edge 2435. In other embodiments, the guiding edge 2433 of the hook 2431 may be curved.

Figure 2:
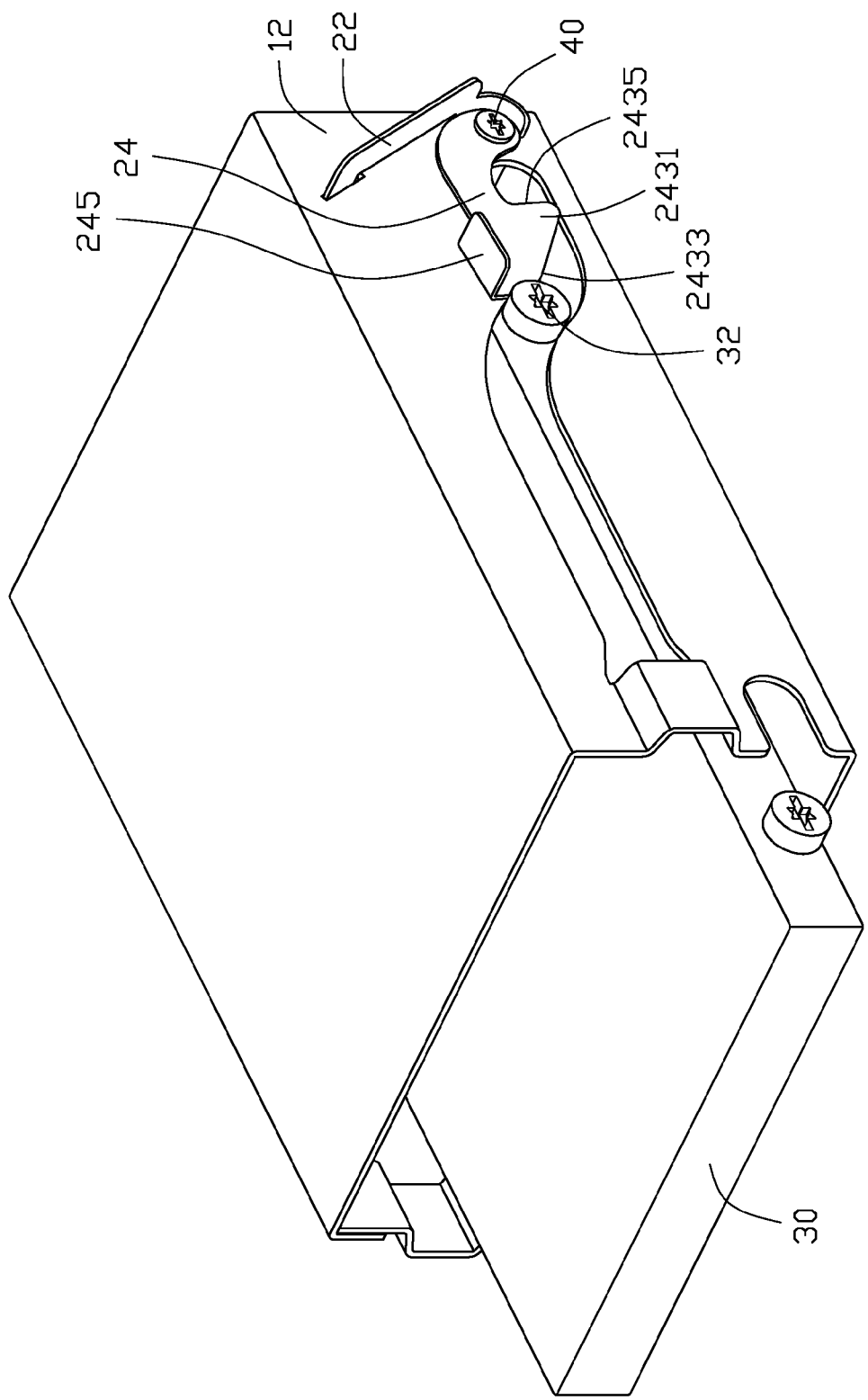
FIG. 2 is a pre-assembled view of FIG. 1, showing the data storage device sliding into the bracket.
Figure 3:
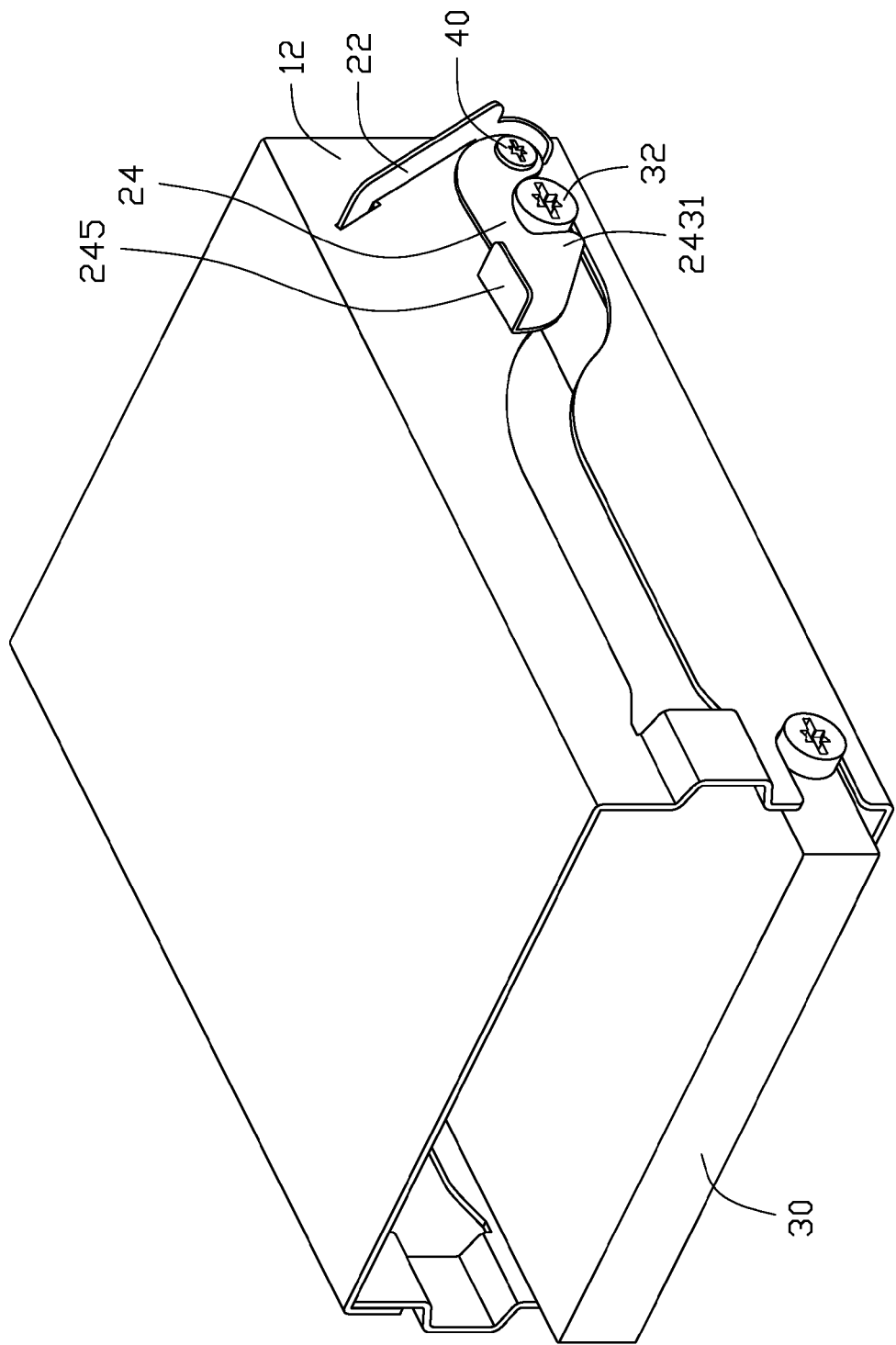
FIG. 3 is an assembled view of FIG. 1, showing the locking member in a natural state when the data storage device is locked in the bracket.

Referring to FIGS. 2 and 3, in assembly, the pivot post 121 is inserted through the pivot hole 241 of the pivot portion 24 of the locking member 20. The protruding piece 221 of the resilient arm 22 of the locking member 20 is engaged in the resisting slot 129 of the side panel 12 of the bracket 10. The fixing member 40 is secured in the pivot post 121 and resists against an exterior surface of the pivot portion 24 of the locking member 20. Thus the locking member 20 is secured to the side panel 12 of the bracket 10. A bottom end joining the guide edge 2433 and the blocking edge 2435 of the hook 2431 reaches the second sliding section 1235 of the first sliding slot 123 of the bracket 10. At this time the resilient arm 22 of the locking member 20 is in a natural state. The pivot portion 24 of the locking member 20 is rotatable about an axis perpendicular to the side panel 12 of the bracket 10.

Then the data storage device 30 is then slid into the bracket 10. The pair of rear studs 32 slide from the shield portions 125 of the side panels 12 to the first sliding sections 1231 of the first sliding slots 123 and then to the connecting sections 1233 of the first sliding slots 123. One rear stud 32 of the data storage device 30 resists against the guiding edge 2433 of the hook 2431 of the locking member 20 when sliding in the connecting section 1233 of the first sliding slot 123. The pivot portion 24 of the locking member 20 is urged to rotate upwards and clockwise until the rear stud 32 reaches the bottom end of the hook 2431, and the resilient arm 22 is elastically deformed. Then the rear stud 32 further slides in the second sliding section 1235 of the first sliding slot 123 of the bracket 10 and passes across the bottom end of the hook 2431. The front studs 32 of the data storage device 30 are slid into the second sliding slots 127 respectively. The resilient arm 22 of the locking member 20 returns to its natural state and urges the pivot portion 24 of the locking member 20 to rotate downwards and anti-clockwise. The rear stud 32 of the data storage device 30 is engaged in the cutout 243 of the pivot portion 24 of the locking member 20 and blocked by the blocking edge 2435 of the hook 2431 of the locking member 20. Thus, the data storage device 30 is secured in the bracket 10.

Figure 4:
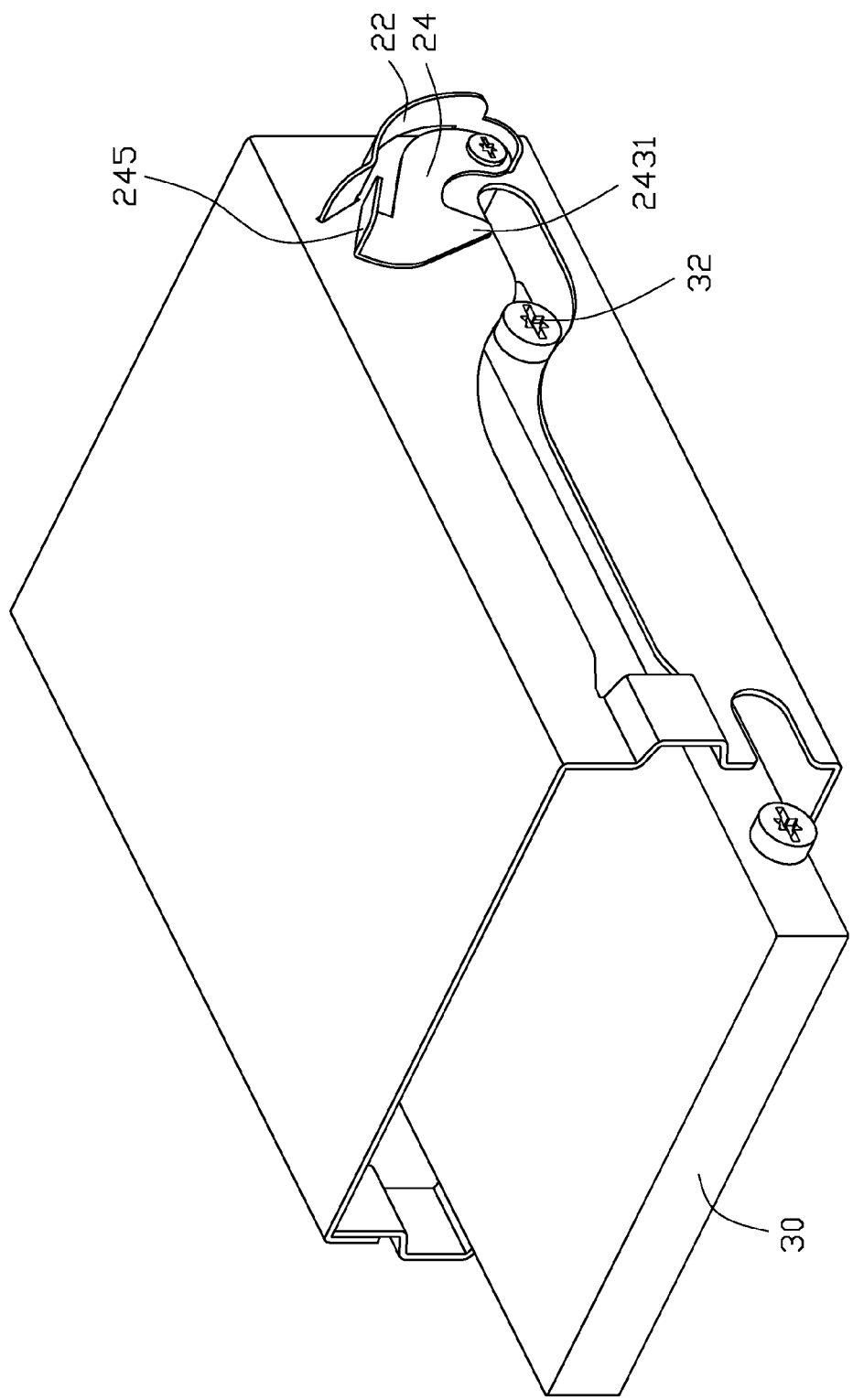
FIG. 4 is similar to FIG. 3, but showing the locking member in a deformed state when the data storage device is unlocked.

Referring to FIG. 4, in disassembly of the data storage device 30, the handle 245 is pulled upwards to urge the pivot portion 24 of the locking member 20 to rotate upwards and clockwise until the rear stud 32 of the data storage device 30 disengages from the blocking edge 2435 of the hook 2431 of the locking member 20. Then the data storage device 30 can be pulled out from the bracket 30.

In other embodiments, a resisting piece may protrude from the side panel 12 of the bracket 10 instead of the resisting slot 129. When the locking member 20 is attached to the side panel 12 of the bracket 10 the distal end of the resilient arm 22 of the locking member 20 resists against a front surface of the resisting piece of the bracket 10 to urge the pivot portion 24 of the locking member 20 to rotate back to its original position.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for a data storage device with at least a stud, comprising:
    a bracket for receiving the data storage device therein, the bracket comprising a side panel with at least one slot defined therein for slidably receiving the stud of the data storage device therein, and a resisting slot being defined in the side panel;
    a locking member attached to the side panel of the bracket, the locking member comprising a pivot portion, rotatable about an axis perpendicular to the side panel of the bracket, and a resilient arm extending from the pivot portion, a first end of the resilient arm connecting with the pivot portion, a second end of the resilient arm inserting into the resisting slot along a direction perpendicular to the side panel, the pivot portion comprising a guiding edge for facilitating the stud of the data storage device sliding into the bracket to a secured position, and a blocking edge for engaging with the stud of the data storage device in the secured position.

2. The mounting apparatus as described in claim 1, wherein the guiding edge of the pivot portion of the locking member is curved.

3. The mounting apparatus as described in claim 1, wherein the guiding edge of the pivot portion of the locking member is inclined relative to a lengthwise direction of the at least one slot.

4. The mounting apparatus as described in claim 1, wherein a cutout is defined in the pivot portion of the locking member for receiving the stud of the data storage device in the secured position, the blocking edge of the pivot portion of the locking member is exposed at the cutout.

5. The mounting apparatus as described in claim 1, wherein the pivot portion of the locking member has a handle extending from a top end thereof.

6. The mounting apparatus as described in claim 1, wherein the at least one slot comprises a first sliding section, a second sliding section parallel to and lower than the first sliding section, and a connecting section connecting between the first sliding section and the second sliding section, the locking member is attached to the side panel beside a rear end of the second sliding section of the at least one slot.

7. A mounting assembly, comprising:
    a data storage device with at least a pair of studs fixed at opposite sidewalls thereof;
    a bracket receiving the data storage device therein, the bracket comprising a pair of side panels, each of the side panels defining at least one slot therein for slidably receiving the at least a pair of studs of the data storage device therein;
    a locking member attached to one side panel of the bracket, the locking member comprising a pivot portion, a resilient arm, and a handle extending from a top edge of the pivot portion along a direction perpendicular to the pair of side panels, the resilient arm connecting with the pivot portion, a distal end of the resilient arm resisting against the side panel of the bracket, the pivot portion comprising a hook rotatable between a first position locking one of the at least a pair of studs of the data storage device in the slot and a second position unlocking the one of the at least a pair of studs of the data storage device;
    wherein the resilient arm is elastically deformed in the second position, and returns to an original state to urge the hook of the pivot position to rotate back to the first position.

8. The mounting assembly as described in claim 7, wherein the pivot portion of the locking member is rotatable about an axis perpendicular to the side panel of the bracket.

9. The mounting assembly as described in claim 7, wherein the hook of the pivot portion of the locking member comprises a guiding edge for facilitating sliding of the one of the at least a pair of studs of the data storage device and a blocking edge engaging with the one of the at least a pair of studs of the data storage in the second position.

10. The mounting assembly as described in claim 9, wherein a cutout is defined in the pivot portion of the locking member for engaging with the one of the at least a pair of studs of the data storage device in the second position, the blocking edge of the hook is exposed at the cutout.

11. The mounting assembly as described in claim 9, wherein the guiding edge of the hook is arc-shaped.

12. The mounting assembly as described in claim 7, wherein a resisting slot is defined in the side panel of the bracket, a protruding piece extending from a distal end of the resilient arm of the locking member is inserted into the resisting slot.

13. The mounting assembly as described in claim 7, wherein a resisting piece protrudes from the side panel of the bracket, a distal end of the resilient arm of the locking member resists against the resisting piece.

14. A mounting assembly, comprising:
    a data storage device having a sidewall with a stud thereon;
    a bracket comprising first and second side panels with the data storage device sandwiched therebetween, the first side panel defining a slot therein, the slot defining a sliding route, the stud of the data storage device being received in the slot and slidable along the sliding route; and a torsional locking member comprising a first leg secured to the first side panel and a second leg, the second leg having a blocking portion configured for allowing the stud to slide in the slot in a first direction and blocking the stud from sliding in the slot in an opposite second direction, the second leg being rotatable relative to the first leg between a first position where the blocking portion is located out of the sliding route and the stud is slidable in the slot in the second direction, and a second position where the blocking portion is located on the sliding route and the stud is blocked by the blocking portion from sliding in the slot in the second direction, wherein an angle between the first leg and the second leg decreases when the torsional locking member turns from a natural state to a deformed state.

15. The mounting assembly as described in claim 14, wherein the first leg is resiliently deformed at the first position and comes back to its original state at the second position.

16. The mounting assembly as described in claim 14, wherein the blocking portion comprises a guide edge configured for allowing the stud to slide in the slot in a first direction and a blocking edge blocking the stud at the second position.

17. The mounting assembly as described in claim 16, wherein a cutout is defined in the second leg for receiving the stud at the second position, the blocking edge is exposed at the cutout.

* * * * *